3,419,516
DEEP SECTION CURE SILICONE RUBBER
Larry Joe Tarno, Flint, Mich., assignor to Dow Corning Corporation, Midland, Mich., a corporation of Michigan
No Drawing. Filed Jan. 7, 1966, Ser. No. 519,298
2 Claims. (Cl. 260—37)

ABSTRACT OF THE DISCLOSURE

Room-temperature curing siloxane rubber compositions which cure in sections deeper than one-half inch are made by mixing.
(1) a hydroxyl-endblocked diorganopolysiloxane,
(2) as a crosslinker a polyfunctional organosilicon compound containing the reactive group SiON=X,
(3) a silica having a surface area of at least 50 m.²/g. and having a water content of at least 3% by weight which silica was prepared by coagulating a silicate from a water solution and thereafter converting the silicate to silica, and
(4) a condensation catalyst.
A specific example would be a mixture of a hydroxyl-endblocked dimethylpolysiloxane, $$C_2H_5Si[ON{=}C(CH_3)(C_2H_5)]_3$$

Hi-Sil 233 and dibutyltin diacetate.

---

This invention relates to room temperature curing silicone rubber containing special silica fillers.

One of the early forms of room temperature curing silicone rubber was the so-called two-component system in which the crosslinking agent was an alkoxy silicate or an alkoxy silane. This system, is in general, characterized by the spontaneous cure of the composition upon mixing the polymer, crosslinker and catalyst. It will cure in deep section, but has been characterized by poor tear and peel strength. The latter is due to the fact that finely divided reinforcing fillers, i.e. those having surface areas of 50 m.²/g. or over interfere with the action of the alkoxy crosslinker. Applicant has found a way to get high strength rubbers from the alkoxy system by using certain carbon blacks as shown in his copending application entitled "High Strength Two-Component Silicone Elastomers." However, one cannot employ reinforcing amounts of finely divided silica fillers in the alkoxy system because the silica inhibits cure due apparently to an interaction of the silica filler with the alkoxy crosslinker. This is true regardless of how the ingredients are mixed. In many applications, particularly relating to electrical insulation, it is not possible to use a carbon black filled rubber because of the conductive nature of the carbon black. Thus, although the alkoxy crosslinked room temperature curing silicone rubbers will cure in deep section, there is at present no way of obtaining a tough, tear resistant, electrical insulating grade of such rubber.

A second general type of room temperature curing silicone rubber is the so-called one-component type in which a polymer, crosslinker and optionally a catalyst are mixed in the absence of moisture and the mixture cured by subsequently exposing the mixture to moisture. Such systems rely primarily upon atmospheric moisture to cause curing. As a result deep sections, that is, one-half inch or greater, will not cure satisfactorily under normal commercial conditions simply because the moisture will not diffuse into the sample to such depths. Attempts have been made to obviate this difficulty by adding water per se to the mixture at the time the mixture is placed in the position of cure. However, this has not proven satisfactory in commercial operation due to the fact that the water reacts preferentially with the crosslinker rather than inducing reaction of the crosslinker with the polymer. Additional attempts have been made by employing a method of generating water in situ by some chemical means. A specific example of such a scheme is shown in U.S. Patent 3,184,427. However, again this "in situ" production of water has proven to be unreliable for commercial operation.

As a result there has been to date no satisfactory way of obtaining deep section cure in one-component silicone rubbers, either of the acyloxy type shown in U.S. Patent 3,035,016, or of the oxime type in U.S. Patent 3,189,576. Nor has it been possible to date to obtain satisfactory deep section cure with a room temperature curing silicone rubber employing a finely divided silica filler as the reinforcing agent.

Thus, there is a substantial need in the art for an electrical grade, deep section curing, room temperature vulcanizing silicone rubber which has improved tear strength and other physical properties. This need has been met by the instant invention.

This invention relates to a method of preparing a silicone rubber by mixing (1) a silicon-bonded hydroxyl containing diorganopolysiloxane in which the organic groups are monovalent hydrocarbon radicals or halogenated monovalent hydrocarbon radicals, said siloxane having a viscosity of at least 100 cs. at 25° C., (2) a crosslinker for (1) comprising an organosilicon compound having attached to silicon on the average at least 3 ON=X groups per molecule in which X is of the group consisting of CR′₂ and

in which R′ is a monovalent hydrocarbon or halohydrocarbon radical, and R″ is a divalent hydrocarbon or halohydrocarbon radical, substantially all of the remaining valences of the silicon atoms in (2) being satisfied by substituents of the group hydrogen, hydrocarbon radicals, halohydrocarbon radicals and oxygen atoms of SiOSi linkages, (3) a silica having a surface area of at least 50 m.²/g. as measured by the Brunauer-Emmett-Teller method and having a bound water content of at least 3% by weight, which silica has been prepared by coagulating a silicate from a water-soluble silicate solution and thereafter converting the coagulated silicate to silica by acid treatment, and (4) a condensation catalyst and thereafter allowing the mixture to cure.

The compositions of this invention spontaneously cure upon mixing the ingredients shown above. This cure occurs throughout the sample regardless of the thickness thereof to produce a tough tear resistant rubber.

For commercial operation it is best to prepare a two-component system in which component (a) comprises ingredients (1) and (3), and component (b) comprises ingredients (2) and (4). The mixture (b) should be protected from moisture until it has been added to mixture (a). It should be understood, however, that the invention is not limited to this method of operation but one can mix all four ingredients simultaneously, provided of course, there is no prolonged storage prior to the time one desires the rubber to cure.

Polymer (1) employed in this invention is a hydroxyl containing organopolysiloxane in which the hydroxyl groups are silicon-bonded. These materials are conventional articles of commerce and as is well-known, they should be essentially diorganopolysiloxanes in which the organic substituents can be any monovalent hydrocarbon radical such as alkyl radicals such as methyl, ethyl, isopropyl, or octadecyl; alkenyl radicals such as vinyl, hexenyl or allyl; cyclohexenyl radicals such as cyclohexyl, cyclopentyl and cyclohexenyl; aryl hydrocarbon radicals such as phenyl, xylyl, naphthyl, tolyl and xenyl; and aralkyl hydrocarbon radicals such benzyl, beta-phenylethyl and betaphenylpropyl and any halohydrocarbon radicals such as chloromethyl, chlorophenyl, bromophenyl, chloropropyl, fluorovinyl,

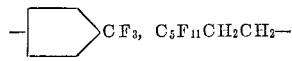

and chloroxenyl.

The crosslinker (2) employed in this invention can be any of the materials shown in Patent 3,189,576, to Edward Sweet, the disclosure of which is hereby incorporated by reference. It is understood, of course, that in order to function as a crosslinker there must be at least three of the defined oxime (ON=X) groups per molecule. Briefly, therefore the crosslinker can be a silane of the formula $R_aSi(ON=X)_{4-a}$ in which $a$ has a value of 0–1, or silcarbanes of the formula

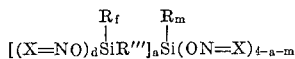

in which $R'''$ is a divalent hydrocarbon radical, $d$ is an integer of from 1–3 inclusive, $f$ is an integer of 0–2 inclusive, the sum of $d+f$ being not greater than 3, $a$ is an integer from 1–4 inclusive, and $m$ is an integer from 0–3 inclusive, and the sum of $a+m$ is not greater than 4.

The crosslinker (2) can also be a siloxane in which some of the silicon atoms have bonded thereto the oxime group and some do not. These siloxanes can be prepared as shown in the above patent by partially hydrolyzing the corresponding silanes or silcarbanes, or by reacting the silanes and silcarbanes shown above with hydroxyl-containing siloxane polymers.

For the purpose of this invention the R group can be any hydrocarbon or halogenated hydrocarbon radical as set forth in the aforesaid Sweet patent in such detail that the repetition of such disclosure is not warranted here. The amount of crosslinker is not critical so long as there is sufficient amount to cause curing of the polymer (1) to a rubbery product.

The silica (3) employed in this invention must have a surface area of at least 50 m.$^2$/g., and preferably at least 100 m.$^2$/g. In addition, the silica must have a bound water content of at least 3% by weight. The term "bound water" refers to the water which can be removed from the silica by heating at elevated temperatures and includes both the water derived from condensation of silanol groups on the surface and water which is merely adsorbed on the silica surface.

In addition, the silicas operative herein are those prepared by coagulating a silicate from a solution of a soluble silicate and thereafter converting the coagulated silicate to silica by reaction with an acid. In general, this method can be carried out in two ways. The first is described in U.S. Patent 2,805,955, which is hereby incorporated by reference, and involves coagulating the silicate by reaction of a solution of alkali metal silicate with an alkaline earth chloride such as calcium chloride to form a finely divided alkaline earth silicate. The latter is then reacted with an acid to remove the alkaline earth metal and produce finely divided silica.

A second method of producing the silicas employed herein is that shown in Canadian Patent 667,143, issued July 23, 1964, which is also incorporated herein by reference.

In brief, this method comprises mixing an alkali metal silicate solution with a coacervating agent such as ammonia in order to coagulate the silicate as shown by an opalescence in the silicate solution and thereafter reacting the coagulated silicate with acid to precipitate silica. As can be seen the common denominator in these two methods involve coagulation of a silicate and thereafter converting the silicate into silica.

For some reason unknown to the applicant, silicas prepared in the above manner contain the right degree or kind of hydration to completely cure the compositions of this invention. This is most unexpected since one cannot obtain such cure with fume silica or silica aerogels even though the preformed silica is treated with water prior to mixing with the formulation. This is true regardless of the amount of water added to the silica. In other words, a fume silica or a silica aerogel, which normally contains a certain amount of absorbed water on its surface will not cure in deep section, nor will it so cure when additional water is mixed with the silica.[1]

The operative silicas of this invention can be employed per se or they can be treated with silanes or siloxanes in order to render the surface hydrophobic. This treatment is carried out by conventional means such as by contacting the silica with linear siloxanes, cyclic siloxanes, halosilanes, silanols or alkoxysilanes, in any of the conventional ways shown in the art. The treated fillers are preferred where the filler and polymer are to be stored in contact with each other for long periods of time prior to mixing with the crosslinking agent and the catalyst.

Silica (3) actually functions in two ways. First, it is a curing aid and second it is a reinforcing agent. The silica can be employed in amount from 2 to 50 parts per 100 parts of (1). If desired, other fillers can be employed together with (3). These include reinforcing fillers such as fume silica, silica aerogels and xerogels and the so-called extending fillers having surface areas less than 50 m.$^2$/g. such as diatomaceous earth, crushed quartz, TiO$_2$, calcium carbonate and the like.

Catalyst employed in this invention can be any of the standard siloxane curing catalyst normally employed in room temperature curing silicone rubber which include metal salts of carboxylic acids such as tin oleate, stannous octoate, lead naphthenate or cobalt octoate; titanium esters such as tetra-butyltitanate or tetra-octyltitanate; amines such as n-butylamine; amine salts such as hexyl amine acetate or guanidine 2-ethylhexoate.

The compositions of this invention can be used in any of the applications in which silicone rubber is normally used such as potting, calking and sealing in the electronic, construction or aerospace industries.

The following examples are illustrative only and should not be construed as limiting the invention, which is properly delineated in the appended claims. The following abbreviations are used below: Me for methyl, Et for ethyl, Ph for phenyl and Vi for vinyl.

---

[1] It should be understood that compositions containing the latter silicas and oxime crosslinkers will cure in thin sections upon exposure to atmospheric moisture.

EXAMPLE 1

The following formulations were prepared:

(1) 150 g. of a hydroxyl endblocked dimethylpolysiloxane of 2400 cs. was mixed with 15 g. of a precipitated silica made in accordance with Patent 2,805,955, and sold under the same Hi-Sil 233. This silica had a water content of from 3–8% by weight and a surface area of about 150 m.$^2$/g.

(2) 150 g. of the siloxane of sample (1) was mixed with 15 g. of a silica prepared in accordance with Canadian Patent 667,143, which had been subsequently treated with methyl hydrogen siloxane to render it hydrophobic. This silica as prepared, had a water content of about 5% and a surface area of 140 m.$^2$/g. and is sold under the name of Quso M–51.

33 g. of each of the above samples was mixed with 2 g. of a mixture comprising 16 parts by weight of EtSi(ON=CMeEt)$_3$ and one part by weight dibutyltindiacetate.

It was found that sample (1) cured to an excellent rubber in 24 hours and that sample (2) cured to an excellent rubber in 72 hours.

EXAMPLE 2

100 parts of a hydroxyl-endblocked dimethylsiloxane of 2500 cs. was mixed with 20 parts of a silica filler prepared in accordance with the aforesaid Canadian patent and which had been rendered hydrophobic by being treated with dimethylpolysiloxane. This filler had a surface area of 150 m.$^2$/g. and a water content of about 5%. The mixture when then mixed with .2 part of dibutyltindiacetate and 5 parts of EtSi(ON=CEtMe)$_3$. After seven days cure at room temperature the rubber had the following properties:

Durometer _____ 42
Tensile _____p.s.i.__ 700
Elongation _____percent__ 370
Peel strength from aluminum _____lbs./in__ 25

The mixture cured in one-half inch deep sections to a dry tack-free rubber in 24 hours.

Attempts to employ this system with methyltriacetoxysilane as a crosslinker proved unsuccessful.

EXAMPLE 3

A 4000 cs. hydroxy ended dimethylsiloxane fluid was mixed with each of the fillers described below in amount 10 parts filler per 100 parts polymer. In each case the mixture was mixed with 5.5 parts by weight of a mixture of 16 parts by weight EtSi(ON=CEtMe)$_3$ and 1 part by weight dibutyl-tin-diacetate. Each sample was placed in a closed space and the cure of a section one-half inch thick was observed. The results are shown in the table below.

(1) A silica prepared by the method of Canadian Patent 667,143, having a surface area of 240 m.$^2$/g. and a water content of 6%.

(2) Silica (1) which had been treated with dimethylsiloxane.

(3) Silica (1) which had been treated with hexamethyldisilazane to give a trimethylsiloxy treated silica.

(4) Silica (1) which had been treated with 3,3,3-trifluoropropylmethylsiloxane.

(5) A fume silica having a surface area of 250 m.$^2$/g.

(6) A fume silica having a surface area of 420 m.$^2$/g. which had been wet with water.

(7) A dimethylsiloxane treated silica aerogel having a surface area of 150 m.$^2$/g.

(8) A trimethylsilyl treated silica xerogel having a surface area of 350 m.$^2$/g. prepared by the procedure of U.S. Patent 3,015,645.

Runs 5 to 8 are for comparison.

TABLE

| Silica | 24 hr. cure | 72 hr. cure |
| --- | --- | --- |
| 1 | Durometer 25 | Durometer 27. |
| 2 | Durometer 28 | Durometer 33. |
| 3 | Durometer 30 | Do. |
| 4 | Durometer 23 | Durometer 31. |
| 5 | No cure | No cure. |
| 6 | do | Do. |
| 7 | do | Do. |
| 8 | do | Do. |

EXAMPLE 4

The procedure of Example 1(2) was repeated except that 5 parts of silica (2) was used with 100 parts of the 2400 cs. hydroxyl ended dimethylsiloxane. This resulting mixture cured in one inch deep section in 24 hours.

EXAMPLE 5

Equivalent rubbers are obtained when the following crosslinkers are employed in the process of Example 1(1).

MeSi(ON=CMe$_2$)$_3$

ViSi(ON=CPh$_2$)

PhSi[ON=$\overline{\text{C(CH}_2\text{)}_3\text{CH}_2}$]$_3$

C$_6$H$_5$CH$_2$Si[ON=C(C$_6$H$_4$Br)(CH$_2$Br)]$_3$

CF$_3$CH$_2$CH$_2$Si[ON=$\overline{\text{C(CF}_2\text{)}_3\text{CF}_3}$]$_3$

Si(ON=CMe$_2$)$_4$

C$_{18}$H$_{37}$Si(ON=CMe$_2$)$_3$

Si(ON=CViPh)$_4$ $$(\text{EtMeC}=\text{NO})_2\overset{\overset{\text{Me}}{|}}{\text{Si}}[\text{OSi}]_{10}\overset{\overset{\text{Me}_2}{|}}{\text{Si}}(\text{ON}=\text{CEtMe})_2$$

$$(\text{Me}_2\text{C}=\text{NO})_3\text{SiCH}_2\text{CH}_2\overset{\overset{\text{Me}_2}{|}}{\text{Si}}\text{ON}=\text{CMe}_2$$

$$(\text{Me}_2\text{C}=\text{N O }\overset{\overset{\text{Me}}{|}}{\text{Si}}\text{O})_4$$

HSi(ON=CMe$_2$)$_3$ $$\text{MeSi}[\text{O}(\overset{\overset{\text{Me}_2}{|}}{\text{Si}}\text{O})_5\overset{\overset{\text{Me}}{|}}{\text{Si}}(\text{ON}=\text{CMe}_2)_2]_3$$

EXAMPLE 6

Deep section curing rubbers are obtained when the following hydroxyl ended siloxanes are employed in the procedure of Example 1(1).

Copolymer of 5 mol percent Ph$_2$SiO and 95 mol percent Me$_2$SiO

Phenylmethyl polysiloxane

Vinylmethyl polysiloxane

Copolymer of 5 mol percent octadecylmethylsiloxane and 95 mol percent Me$_2$SiO

Copolymer of 60 mol percent EtMeSiO and 30 percent

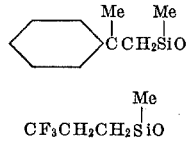

That which is claimed is:

1. A method of preparing silicone rubber comprising mixing
  (1) a silicon bonded hydroxyl containing diorganopolysiloxane having a viscosity of at least 100 cs. at 25° C. in which the organic groups are monovalent hydrocarbon radicals or monovalent halohydrocarbon radicals,
  (2) a crosslinker for (1) comprising an organosilicon compound having on the average of per molecule at least 3 silicon-bonded groups of the formula ON=X in which X is of the group consisting of $CR'_2$ and

in which R' is a monvalent hydrocarbon or halohydrocarbon radical, and R" is a divalent hydrocarbon or halohydrocarbon radical, substantially all of the remaining valences of the silicon atoms in (2) being satisfied by substituents hydrogen, hydrocarbon radicals, halohydrocarbon radicals or oxygen atoms of SiOSi linkages, (3) a silica having a surface area of at least 50 m.²/g. as measured by the Brunauer-Emmett-Teller method and having a bound water content of at least 3% by weight, which silica has been prepared by coagulating a silicate from a water-soluble silicate solution and thereafter converting the coagulated silicate to silica by acid treatment, and (4) a condensation catalyst and thereafter allowing the mixture to cure, whereby deep section cure is obtained.

2. The method in accordance with claim 1 in which (1) is a dimethylsiloxane and (4) is a tin salt of a carboxylic acid.

References Cited
UNITED STATES PATENTS

| | | | |
|---|---|---|---|
| 3,189,576 | 6/1965 | Sweet | 260—18 |
| 3,047,528 | 7/1962 | Bluestein | 260—18 |

MORRIS LIEBMAN, *Primary Examiner.*

J. E. CALLAGHAN, *Assistant Examiner.*

U.S. Cl. X.R.

260—18